Dec. 21, 1948.  P. BERGH  2,456,857
MOTION PICTURE TARGET

Filed Jan. 24, 1944  3 Sheets-Sheet 1

Inventor
PHILIP BERGH
By Ralph B. Stewart
Attorney

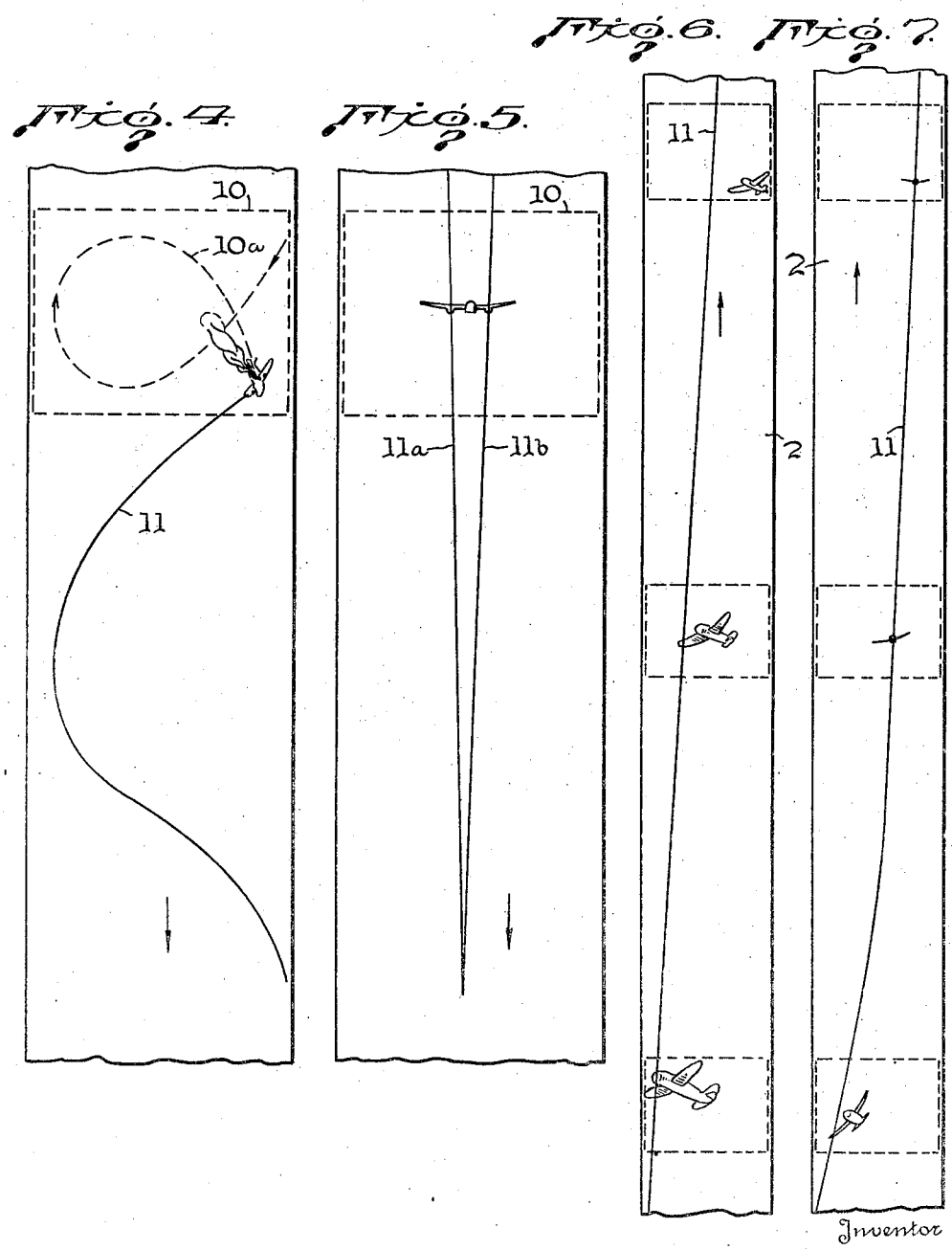

Dec. 21, 1948. P. BERGH 2,456,857
MOTION PICTURE TARGET
Filed Jan. 24, 1944 3 Sheets-Sheet 3
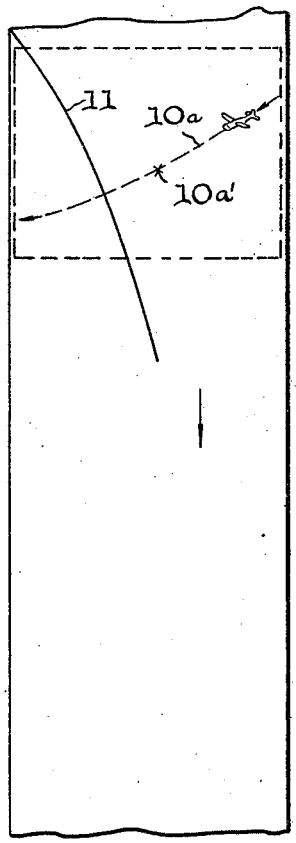
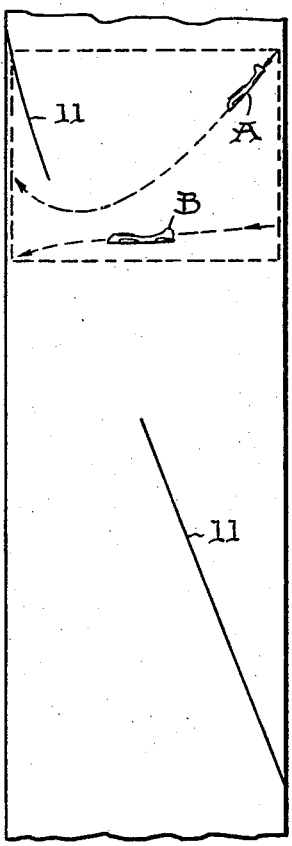
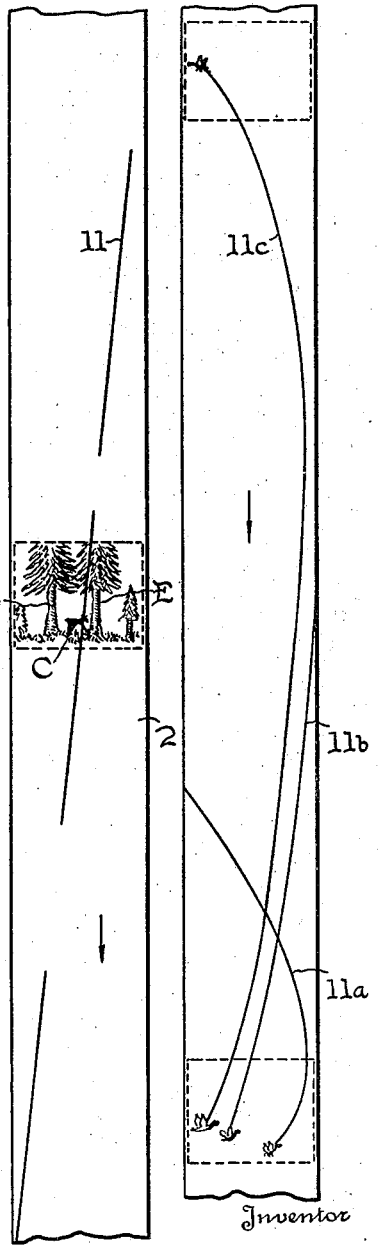
PHILIP BERGH
By Ralph B. Stewart
Attorney Patented Dec. 21, 1948

2,456,857

UNITED STATES PATENT OFFICE 2,456,857

MOTION-PICTURE TARGET

Philip Bergh, Forest Hills, N. Y.

Application January 24, 1944, Serial No. 519,583

1 Claim. (Cl. 273—105.1)

This invention relates to target apparatus and to a novel method of target practice.

An object of the invention is to devise target apparatus which will permit the use of live ammunition on a moving target and wherein the movement of the target is an accurate simulation of the movement of an actual target such as would be encountered in hunting game or in warfare.

A more specific object of the invention is to devise apparatus by which the hits on a moving target may be recorded and later observed by the marksman.

Still another object is to devise apparatus suitable for training a marksman to gauge and use the proper lead in firing on a swiftly moving target.

In accomplishing the objects of my invention, I employ motion pictures to simulate or represent the moving target, and these motion pictures may be pictures of actual moving objects, or they may be of the so-called "animated" type formed from a series of separate drawings in a well known manner. The motion pictures representing the moving target are projected upon a suitable projection screen which is formed of a web of sheet material arranged to be moved transversely of the projection axis and in timed relation with the operation of the projector. In use of the apparatus, the marksman shoots at the image of the moving target and the bullets perforate the moving screen whereupon the motion picture and the moving screen, or the screen alone, may be re-run for observation.

For the purpose of indicating the accuracy of firing, the screen may be provided with a line marked thereon by an experienced marksman while the picture is being projected on the screen. Where it is desired to test the accuracy of a marksman to follow a moving object without any lead, the line marked on the screen would be known as a "position line" and would follow the path on the screen actually traversed by the moving target. For the purpose of training the marksman to use the proper lead, the line marked on the screen would be designated as a "lead line" and would serve to indicate the path along the surface of the screen which should be perforated by the firing if the marksman is firing at a proper lead to hit the vital spot of the moving target. After the motion picture and screen have been run through and the marksman has fired at the target, the screen is rewound and then run through again, either with or without the simultaneous projection of the pictures on the screen, and the marksman may then observe the accuracy of his shooting by observing how closely the perforations fall upon the marked position line (or the lead line) on the screen.

My improved apparatus and method may be applied to civilian shooting galleries to greatly increase the pleasure of the marksman and to improve his skill. The invention is also highly useful in training soldiers and other military personnel for proper use of firearms under various conditions and situations which might be encountered in actual warfare.

Suitable apparatus for carrying out my invention is illustrated in the accompanying drawing in which:

Figures 3 to 11, inclusive, represent the various arrangements of lead lines on the screen strip for different movements of the target.

Figure 1:
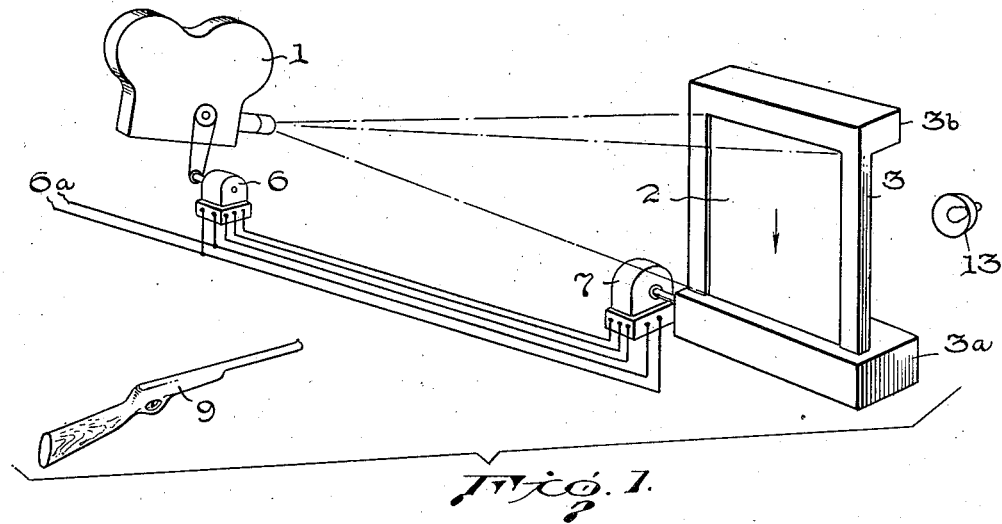
Figure 1 is a diagrammatic perspective view showing the general arrangement of the target apparatus.
Figure 2:
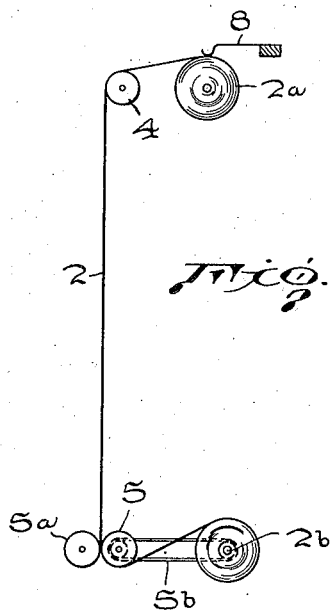
Figure 2 is a diagrammatic representation of the method of driving the moving screen.

Referring to Figure 1 of the drawing, 1 represents a motion picture projector of known construction for projecting the image of a moving target upon a screen 2 of suitable size for receiving the field of the projected picture. The screen 2 is formed of a web or strip of suitable material, such as paper or cloth having a front surface suitable for use as a motion picture projection screen. The screen web is supported within a suitable frame 3 having a boxlike base 3a and a similar boxlike housing 3b at the top thereof for receiving the web supply roll 2a shown in Figure 2. The web passes from supply roll 2a over a suitable guiding roll 4 located within casing 3b, and then passes vertically downward with opposite edges thereof positioned within suitable channels formed in the vertical side members of frame 3. Upon entering base 3a the web passes around a suitable drive roll 5 to a take-up roll 2b. The drive roll 5 is of suitable construction for driving the web 2 at a speed bearing a predetermined relation with the speed of operation of the motion picture film, and it may be provided with sprockets for engaging rows of perforations formed in the web 2 at the side edges thereof. The projector 1 and the projector web 2 are maintained in synchronous driving relation by any suitable means represented in Figure 1 by a pair of Selsyn motors 6 and 7, the motor 6 being coupled to the driving mechanism of the projector while the motor 7 is connected to drive roll 5. The supply circuit for motors 6 and 7 is shown at 6a. A suitable guiding roll 5a is located on the opposite side of web 2 from the drive roll 5. The take-up roll 2b may be driven by an independent motor, or it may be driven from motor 7 through any suitable slipping drive represented by the belt 5b in Figure 2. A suitable brake device represented by the brake shoe 8 in Figure 2 is provided to prevent unwinding of the web from supply roll 2a faster than required by the operation of drive roll 5.

The gun 9 shown in Figure 1 represents the approximate position of the gun when being fired by a marksman, although the relative positions of the projector and the gun may be varied from those shown in Figure 1.

If it is desired to pre-mark a screen length for either scoring purposes or to add a visible and intentional guide for proper aiming, a desired picture sequence is projected on the web while it is simultaneously driven downwardly in timed relation with the speed of projection of the pictures. During the projection of the pictures and movement of the web, an experienced marksman observes the pictures on the screen and marks a line on the screen, either following the path of movement of the vital spot of the image for a "position" line, or else following a path slightly in advance of this spot for a "lead" line to indicate the proper lead for firing on the moving image. In both cases the line follows the locus of the "aiming point" of the image as it traverses the projection area of the screen. In the case of the "position" line, the aiming point coincides with the vital spot of the image, and in the case of the "lead" line, the aiming point is in advance of the vital spot when the image is traversing the screen.

Figure 3:
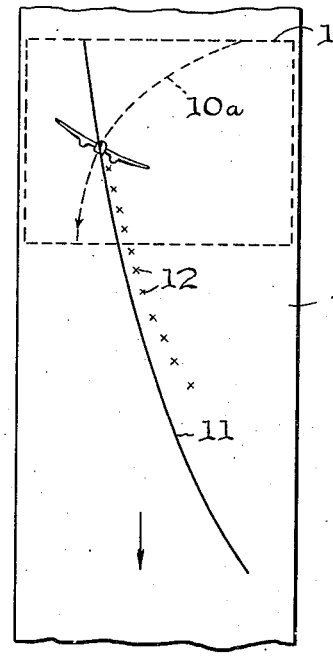

In Figure 3 I have shown the manner in which a length of web would be marked with a position line which follows the path of travel of the vital spot of an airplane which traverses the projection area indicated by the dotted rectangle 10. The path of travel of the vital spot of the airplane across the projection field is indicated by the dotted line 10a. The movement of the web 2 is downwardly, although it could be upwardly, but preferably is transversely of the direction of movement of the airplane. During the projection of the picture sequence and timed movement of the web 2, a line 11 is marked on the front face of the web which traces the path of the vital spot of the target (the center of the airplane) as it passes through the projection field. This line may be traced by holding a pencil or crayon against the web and following the vital spot of the target as it traverses the projection field.

After the web has been prepared as indicated above, the motion picture and the web are again rerun in the same timed sequence and the marksman fires on the screen in an effort to hit the vital spot of the moving target. The screen will be perforated by the bullets, and the position of the perforations with respect to the line 11 will be an indication of the accuracy of the marksman's aim. For example, the line of crosses indicated at 12 might be a typical arrangement of the perforations where the marksman is aiming directly at the vital spot of the moving target but his aim has been consistently to the right of the target on all shots.

After the marksman has fired at the target, the pictures and the web are again run through the same sequence and the marksman may then view the web from a short distance to observe the accuracy of his firing by noting the position of the perforations with respect to the line 11 or with respect to the moving image of the target projected on the screen. In some cases it would be desirable to run through the sequence in step by step movement or at a slow motion rate.

For the purpose of aiding the inspection of the perforations in the web 2, a source of light represented at 13 may be placed in the rear of the screen and this light would be energized during inspection only. The intensity of the light 13 should be low enough so that the light passing through the perforations in the screen will not prevent proper viewing of the picture projected on the front of the screen.

Figure 4 shows the manner in which the web would be marked to follow the vital spot of an airplane which flies through a loop in the projection field.

Figure 5 shows the marking of a film where the moving target has two vital spots, and in this case the target is a two-engine airplane which is flying directly towards the marksman. In this case two lines 11a and 11b are marked on the web as it moves downwardly. As will be seen, these two lines start from a single point when the airplane is quite far away from the marksman, and the two lines diverge as the plane approaches. In some cases, as in Figure 5, the target may not have a single vital spot but it may have a vital area. In this case two lines would be drawn indicating the outer limits of the vital area, and any shot falling between these two lines would be counted as effective. If desired, the area between the two lines 11a and 11b could be shaded in any desired manner.

In Figure 6 I have shown the manner in which the screen web would be marked to indicate the proper "lead" for firing on an object moving across the projection field. In this case three frames of a picture sequence have been shown, the target being an airplane which is approaching the marksman and at the same time is flying from the lower righthand corner to the upper lefthand corner of the projection field. As shown in the upper frame, the lead line 11 is positioned quite far in advance of the plane when the plane is quite far from the marksman. As the plane approaches, the lead line is placed at a shorter distance in front of the plane as shown by the middle frame, and as the plane reaches its closest distance in the projection field, the lead line comes nearest to the vital spot as shown in the lower frame. It will be understood that the lead line shown in Figure 6 has been drawn for an upward movement of the web 2, but the web could be moved downwardly if desired.

In Figure 7 I have shown the manner in which the web 2 would be marked to indicate the proper lead on an airplane which first flies directly towards the marksman and then turns to the left before passing out of the projection field. So long as the target is approaching the marksman, the lead line follows the vital point of the target as shown in the two upper frames, but as soon as the plane turns and begins flying across the projection field, the lead line 11 is marked to have the proper lead with respect to the vital point of the target, as shown in the lower frame.

In Figure 8 I have shown how a web would be marked for training a marksman to judge when the moving object is within the range of his gun. In this case the target is an airplane which is approaching the marksman at an angle from right to left, the dotted line 10a indicating the path of travel of the target through the projection field and the point 10a' representing the point where the airplane comes within the effective range of the gun being used. In this case the film is not marked until the airplane reaches the point 10a', and then the line 11 is formed on the web by following the vital spot of the airplane through the remainder of its path of travel, either with or without proper lead.

In Figure 9 I have shown how a film would be marked for training a marksman to cease firing on a target where there is likely to be danger of hitting a friendly plane in the action between two planes. In this case a friendly plane A is diving upon an enemy plane B. It would be unsafe to continue firing on the enemy plane when the friendly plane is near plane B, and in order to train the marksman in judging when to stop firing, the line 11 will have a gap as shown in Figure 9 when the plane A is at the lowest point in its line of travel and is in the danger zone. As will be seen, the line 11 extends over the areas where the plane A is approaching the plane B and is going away from it.

In Figure 10 I have shown the manner in which a web would be marked in a hunting scene where the game temporarily disappears or where there is interference between fixed objects and the moving target. In this case, the target is illustrated as a deer C running across the projection field from left to right and behind two large trees D and E. In this case the line 11 marked on the web would have two gaps located at the places where the deer passes behind the two trees.

In Figure 11 I have illustrated how the film would be marked where there may be more than one moving object or target in the projection field. In this case the lower frame representing an early phase of the action sequence shows three ducks in flight, all headed in generally the same direction. As shown by the line 11a, one of the ducks changes its direction of flight and leaves the projection field rather quickly and flying towards the left. A second duck continues its original direction of flight and leaves the projection field at a later time as shown by the line 11b. The third duck remains in the projection field for a longer time but reverses its direction of flight and is shown in the upper frame in a position about to fly out of the projection field.

For the purpose of securing proper synchronization of the motion picture film and the screen web, appropriate marks or identifying indicia would be placed on the edges of the film and the web so that these two elements may be started in proper relationship, and they are thereafter maintained in proper relationship by the synchronous operation of the Selsyn motors 6 and 7. For example, before running the picture and screen for the purpose of marking on the screen a position or lead line, the first frame of the picture would be projected on the screen as a "still," and a horizontal line would be marked on the screen with respect to a suitable reference point on the picture such as the top border of the projection field, and this line could be marked "Match with upper border of first picture frame" or "Match with upper border of picture frame No. —." It is not necessary to apply the legend to the mark where the operator understands the purpose of the mark. It will be understood that suitable driving means is provided for the supply roll 2a for rewinding the screen web after each run of the motion picture sequence.

While I have shown and described an arrangement in which the screen web is driven downwardly during the marking and shooting periods, it will be understood that the web might be driven upwardly instead, or it could be driven across the projection field in a horizontal direction instead of vertically. Preferably the screen should be driven transversely of the direction of movement of the target across the projection field and at a rate sufficiently high to cause the bullet holes to be separated.

For realistic training I prefer to use regular live ammunition, where the projectile is propelled by an explosive charge, but it will be understood that the projectile may be propelled by other known means, such as by compressed air. The projectile should be propelled with sufficient force to perforate the screen and to provide the necessary accuracy of firing. It will be understood that a suitable back stop would be provided in the rear of the screen for receiving the projectiles after passing through the screen. Also, the source of light 13 would be removed from behind the screen during actual firing, or else it would be positioned out of the line of fire. Instead of using a light source 13 behind the screen, an illuminated reflecting screen may be placed behind the projection field during re-running of the film after firing.

Instead of using a single moving screen as a target, a double moving screen may be employed of the types shown in United States patents to Bates et al. 1,027,371 and to Bennett 1,081,943, the two screens being moved in opposite directions in synchronous relation with the operation of the film, and each screen being provided with appropriate marks or indicia to start the screens off in proper relation with the film. With such arrangements, only one bullet hole will be visible at any instant on re-running of the film and screens.

For the purpose of improving the realistic effect, the motion picture may be accompanied by appropriate sound effects such as would be experienced in actual combat during warfare. Another aid to the marksman would be the use of non-inflammable tracer bullets or fluorescent pellets in firing on the target under subdued illumination as would be required for use of motion pictures. Also, for ammunition it is possible to use blank cartridges with real or loaded bullets interspersed at regular intervals so that rapid firing machine guns may be used on a given screen or scene where the movement of the screen might be relatively slow and where the perforations formed by the loaded bullets would be adequate for scoring purposes.

The screen web may be used several times by placing patches over the perforations, preferably on the rear side of the web where the scoring line is carried by the front face of the web. It will be understood, however, that the scoring line may be placed on the rear face of the web.

I have described one modification of my invention for the purpose of illustrating the principle thereof, but it will be understood that various modifications may be made without departing from the scope of the invention.

I claim:

In target apparatus wherein a motion picture image sequence of a moving target is projected upon a screen, the improvement which consists in a screen formed of an elongated strip of sheet material on which the field of projection of said projected pictures covers only a small linear portion thereof, said strip having a line marked thereon throughout its length, the position of said line in different linear portions of said strip coinciding with the aiming spot of the target image within the picture area in successive portions of the image sequence.

PHILIP BERGH.

REFERENCES CITED

The following references are of record in the file of this patent:

UNITED STATES PATENTS

| Number | Name | Date |
| --- | --- | --- |
| 1,072,293 | Bates et al. | Sept. 2, 1913 |
| 1,803,064 | Karnes et al. | Apr. 28, 1931 |
| 1,841,262 | Wallace | Jan. 13, 1932 |
| 2,230,149 | Weddington | Jan. 28, 1941 |